US009170617B2

(12) United States Patent
Sonobe

(10) Patent No.: US 9,170,617 B2
(45) Date of Patent: Oct. 27, 2015

(54) INFORMATION PROCESSING APPARATUS TO SELECTIVELY DISABLE OR THROTTLE AN EXTERNAL GRAPHICS CONTROLLER

(75) Inventor: Hajime Sonobe, Tachikawa (JP)

(73) Assignee: Kabushiki Kaisha Toshiba, Minato-Ku, Tokyo (JP)

(*) Notice: Subject to any disclaimer, the term of this patent is extended or adjusted under 35 U.S.C. 154(b) by 694 days.

(21) Appl. No.: 13/164,595

(22) Filed: Jun. 20, 2011

(65) Prior Publication Data

US 2011/0252219 A1  Oct. 13, 2011

Related U.S. Application Data

(63) Continuation of application No. 12/759,521, filed on Apr. 13, 2010, now abandoned.

(30) Foreign Application Priority Data

Jun. 30, 2009  (JP) ................................. 2009-155566

(51) Int. Cl.
*G06F 1/32* (2006.01)
*G06F 1/20* (2006.01)
*G09G 5/36* (2006.01)

(52) U.S. Cl.
CPC .............. *G06F 1/206* (2013.01); *G06F 1/3203* (2013.01); *G06F 1/3215* (2013.01); *G06F 1/3293* (2013.01); *G09G 5/363* (2013.01); G09G 2330/021 (2013.01); G09G 2360/06 (2013.01); Y02B 60/121 (2013.01); Y02B 60/1275 (2013.01)

(58) Field of Classification Search
None
See application file for complete search history.

(56) References Cited

U.S. PATENT DOCUMENTS 7,353,409 B2 * 4/2008 Hartman et al. ............... 713/300
7,653,824 B2  1/2010 Rangarajan et al.
7,721,128 B2  5/2010 Johns et al.
(Continued)

FOREIGN PATENT DOCUMENTS

JP  4350730  12/1992
JP  10312225  11/1998
(Continued)

OTHER PUBLICATIONS

Japanese Patent Application No. 2010-189691, Notification of Reasons for Refusal, mailed May 8, 2012, (with English Translation).
(Continued)

*Primary Examiner* — Jacob A Petranek
(74) *Attorney, Agent, or Firm* — Rutan & Tucker LLP; William W. Schaal

(57) ABSTRACT

According to an aspect of the present invention, there is provided an information processing apparatus including: a first processor; a second processor that has an information processing capability and a power consumption higher than those of the first processor; a temperature monitoring module configured to acquire an operating temperature of the second processor; a throttle number determination module configured to determine whether the throttling control is performed a given number of times or more within a given time interval; and a processor switching control module configured to perform, when the operating temperature of the second processor is equal to or higher than a given temperature: stopping an operation of the second processor; causing the first processor to perform an information process; and prohibiting the operation of the second processor.

19 Claims, 12 Drawing Sheets

(56) References Cited

U.S. PATENT DOCUMENTS

| | | |
|---|---|---|
| 7,793,291 B2 | 9/2010 | Arai et al. |
| 7,814,489 B2 | 10/2010 | Uemura et al. |
| 2003/0070104 A1 | 4/2003 | Bruckner et al. |
| 2004/0117677 A1 | 6/2004 | Jahagirdar et al. |
| 2004/0228091 A1 | 11/2004 | Miyairi |
| 2005/0050373 A1 | 3/2005 | Orenstien et al. |
| 2007/0094444 A1 | 4/2007 | Sutardja |
| 2007/0136617 A1 | 6/2007 | Kanno et al. |
| 2007/0171230 A1 | 7/2007 | Iwase et al. |
| 2008/0001954 A1 | 1/2008 | Hirabayashi |
| 2008/0009181 A1 | 1/2008 | Dunham et al. |

FOREIGN PATENT DOCUMENTS

| | | |
|---|---|---|
| JP | 2000347758 | 12/2000 |
| JP | 2003-256080 | 9/2003 |
| JP | 2004-302996 | 10/2004 |
| JP | 2004-3020996 | 10/2004 |
| JP | 2004280378 | 10/2004 |
| JP | 2007148952 | 6/2007 |
| JP | 2007179225 | 7/2007 |
| JP | 2007249720 | 9/2007 |
| JP | 2007305106 | 11/2007 |
| JP | 2008009181 | 1/2008 |
| JP | 2008152567 | 7/2008 |

OTHER PUBLICATIONS

U.S. Appl. No. 12/759,521, Non-Final Office Action, mailed Dec. 1, 2010.

U.S. Appl. No. 12/759,521, Final Office Action, mailed Mar. 18, 2011.

* cited by examiner

FIG. 7

| A: SWITCHING FACTORS FROM iGPU TO dGPU |
|---|
| A-1: CASE WHERE SWITCHING REQUEST FROM USER IS ACCEPTED THROUGH OPERATION INPUT UNIT |
| A-2: CASE WHERE AC ADAPTOR IS CONNECTED |
| A-3: CASE WHERE APPLICATION PROGRAM ASSOCIATED WITH dGPU IS TO BE EXECUTED |
| A-4: CASE WHERE DISPLAY IS OUTPUT TO DISPLAY DEVICE ASSOCIATED WITH dGPU |
| A-5: CASE WHERE LOAD OF DISPLAY CONTROL PROCESS IS INCREASED |
| A-6: CASE WHERE COOLING MODE OF SYSTEM IS CHANGED TO "PERFORMANCE PREFERENCE" |
| B: SWITCHING FACTORS FROM dGPU TO iGPU |
| B-1: CASE WHERE SWITCHING REQUEST FROM USER IS ACCEPTED THROUGH OPERATION INPUT UNIT |
| B-2: CASE WHERE CONNECTION TO AC ADAPTOR IS RELEASED |
| B-3: CASE WHERE APPLICATION PROGRAM ASSOCIATED WITH iGPU IS TO BE EXECUTED |
| B-4: CASE WHERE DISPLAY IS OUTPUT TO DISPLAY DEVICE ASSOCIATED WITH iGPU |
| B-5: CASE WHERE LOAD OF DISPLAY CONTROL PROCESS IS DECREASED |
| B-6: CASE WHERE COOLING MODE OF SYSTEM IS "SILENCE PREFERENCE" AND TEMPERATURE OF dGPU IS EQUAL TO OR HIGHER THAN GIVEN TEMPERATURE |
| B-7: CASE WHERE TEMPERATURE OF dGPU IS EQUAL TO OR HIGHER THAN GIVEN TEMPERATURE |
| B-8: CASE WHERE THROTTLING CONTROL IS PERFORMED GIVEN TIMES OR MORE WITHIN GIVEN TIME INTERVAL |
| *FOR SWITCHING FACTORS OF B-7 AND B-8, SWITCH FLAG IS SET TO "DISABLED" |

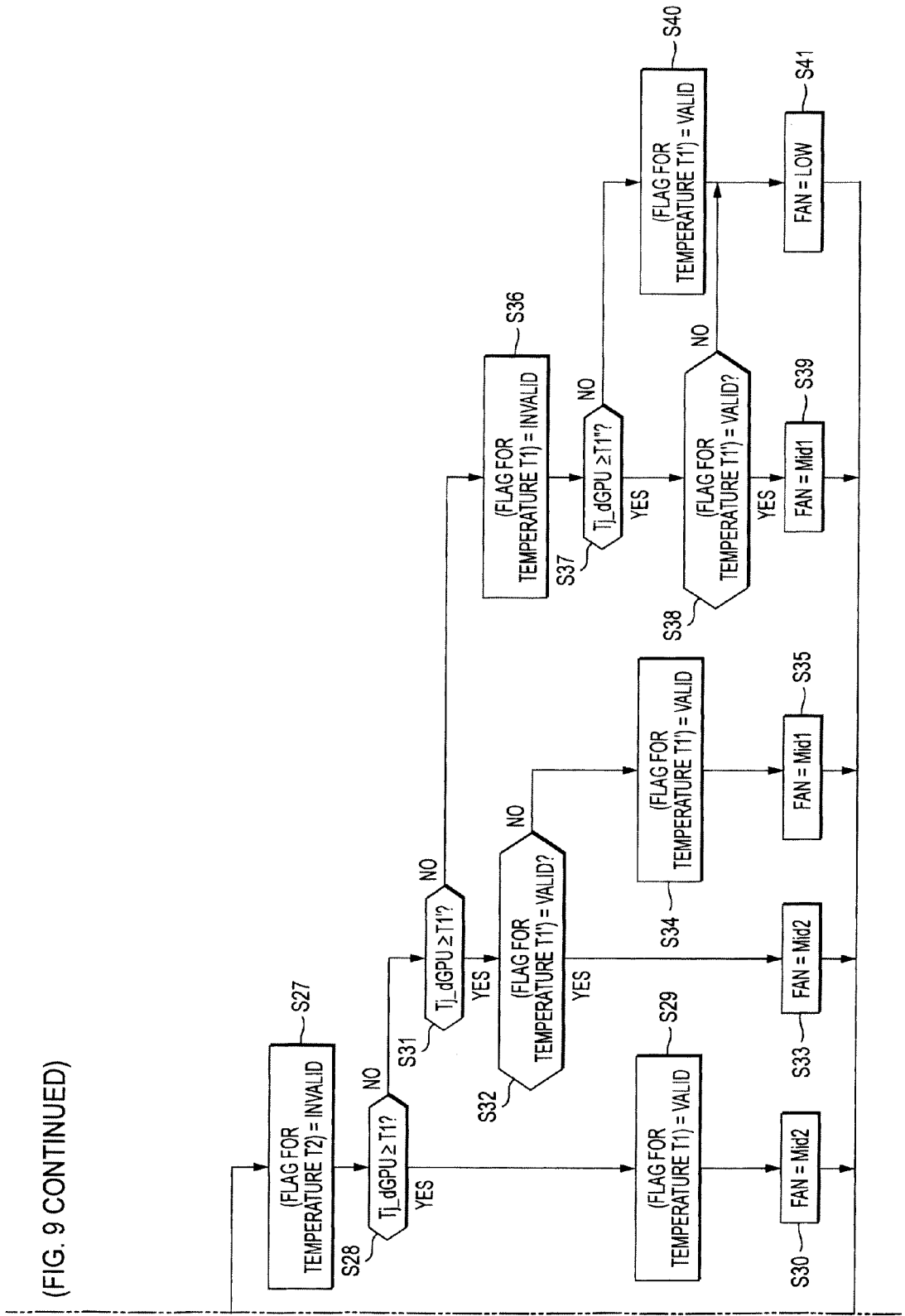

INFORMATION PROCESSING APPARATUS TO SELECTIVELY DISABLE OR THROTTLE AN EXTERNAL GRAPHICS CONTROLLER

CROSS-REFERENCE TO RELATED APPLICATIONS

This application is a continuation which is based upon and claims the benefit of priority from U.S. patent application Ser. No. 12/759,521, filed Apr. 13, 2010 and is based upon and claims the benefit of priority from Japanese Patent Application No. 2009-155566, filed on Jun. 30, 2009, the entire contents of which are incorporated herein by reference.

BACKGROUND

1. Field

An aspect of the present invention relates to an information processing apparatus that uses plural processors that can individually perform an information process.

2. Description of the Related Art

Conventionally, technology for using plural processors (for example, GPUs (Graphics Processing Units) or the like) of such a type that can individually perform an information process has been disclosed in JP-2008-009181-A.

The information processing apparatus disclosed in JP-2008-009181-A includes an internal graphic controller (the first processor) that can perform display control of a display and control means that causes the internal graphic controller to perform a process other than the display control in a case where a graphic controller (the second processor) is externally installed and is configured to decrease the process load of a CPU by using the internal graphic controller out of the two graphic controllers for a process other than the display control such as a process for the operation of a trans code or numeric calculation.

Meanwhile, a method (hereinafter, referred to as a switchable method) in which one processor is used for an information process by dynamically switching among plural processors as needed has been known. The switchable method is useful particularly in a case where there are differences in the capability or the power consumption of the plural processors.

For example, in a case where two processors including the first and second processors are used and the second processor has relatively high capability and high power consumption, compared to the first processor, by using the switchable method, a low-load information process is performed by the first processor for suppressing the power consumption, and a high-load information process is performed at a high speed by using the second processor, whereby an information process that utilizes the characteristics of the processors can be performed.

However, in the conventional switchable method, the temperatures of the processors are not considered at the time of switching among the processors. Accordingly, by using the conventional switchable method, it is difficult to prevent thermal runaway of the processors.

BRIEF DESCRIPTION OF THE DRAWINGS

A general architecture that implements the various feature of the present invention will now be described with reference to the drawings. The drawings and the associated descriptions are provided to illustrate embodiments of the present invention and not to limit the scope of the present invention.

FIG. 7 illustrates an example of switching factors from the iGPU to the dGPU and the switching factors from the dGPU to the iGPU.

DETAILED DESCRIPTION

Various embodiments according to the present invention will be described hereinafter with reference to the accompanying drawings. In general, according to one embodiment of the present invention, there is provided an information processing apparatus including: a first processor; a second processor that has an information processing capability and a power consumption higher than those of the first processor; a temperature monitoring module configured to acquire an operating temperature of the second processor; and a processor switching control module configured to perform, when the operating temperature of the second processor is equal to or higher than a given temperature: stopping an operation of the second processor; causing the first processor to perform an information process; and prohibiting the operation of the second processor.

Hereinafter, information processing apparatuses according to embodiments of the present invention will be described with reference to the accompanying drawings.

Figure 1:
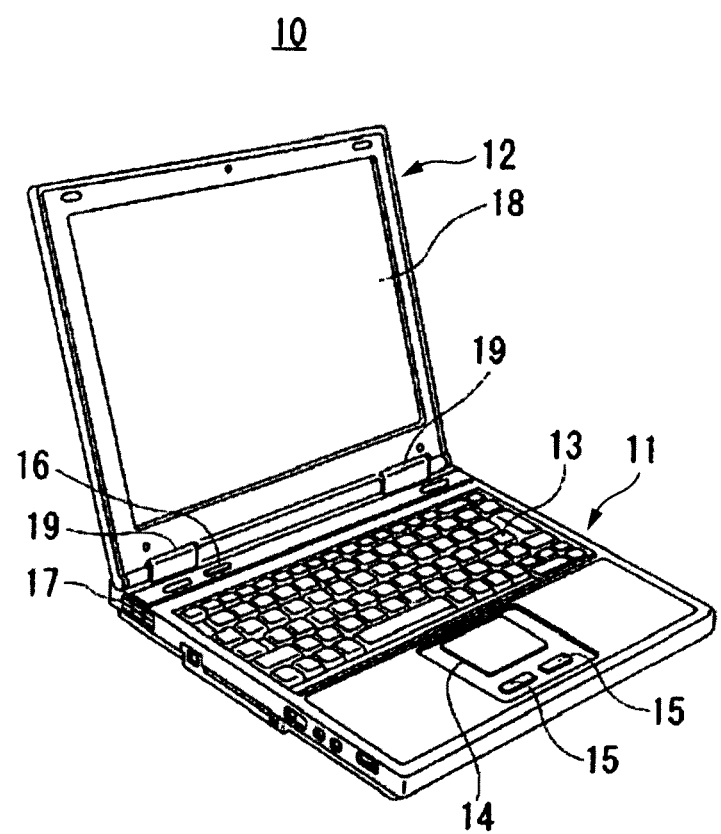
FIG. 1 illustrates an information processing apparatus according to a first embodiment.

FIG. 1 illustrates an information processing apparatus according to a first embodiment. The embodiment may be applied to an information processing apparatus using plural processors that can individually perform information processes. As the information processing apparatus according to the embodiment, there will be described a notebook-type personal computer (hereinafter, referred to as a personal computer) that includes two GPUs capable of individually performing a display control process and supports the switchable GPU method in which one GPU is used for a display control process by dynamically switching between the two GPUs as needed.

As shown in FIG. 1, the personal computer 10 includes a computer main body 11 and a display unit 12 as a display device.

The computer main body 11 has a thin box-type casing. In the center portion of the top face of the casing, a keyboard 13 as an operation input device is disposed. On the front side of the top face of the casing of the computer main body 11, a palm rest is formed. In the approximate center portion of the palm rest, a touch pad 14 and touch pad control buttons 15 are disposed as operation input devices. On the inner side of the top face of the casing of the computer main body 11, a power button 16 for turning the power of the personal computer 10 on or off is disposed. On the side face of the casing of the computer main body, an exhaust portion 17 having an exhaust opening for exhausting a cooling wind from a cooling fan, which is arranged inside the casing, to the outside is disposed.

The display unit 12 has a display panel that is configured by an LCD (Liquid Crystal Display) 18. The display unit 12 is connected to the computer main body 11 through connection portions (hinges) 19 that support the computer main body 11 to be freely open or closed.

Figure 2:
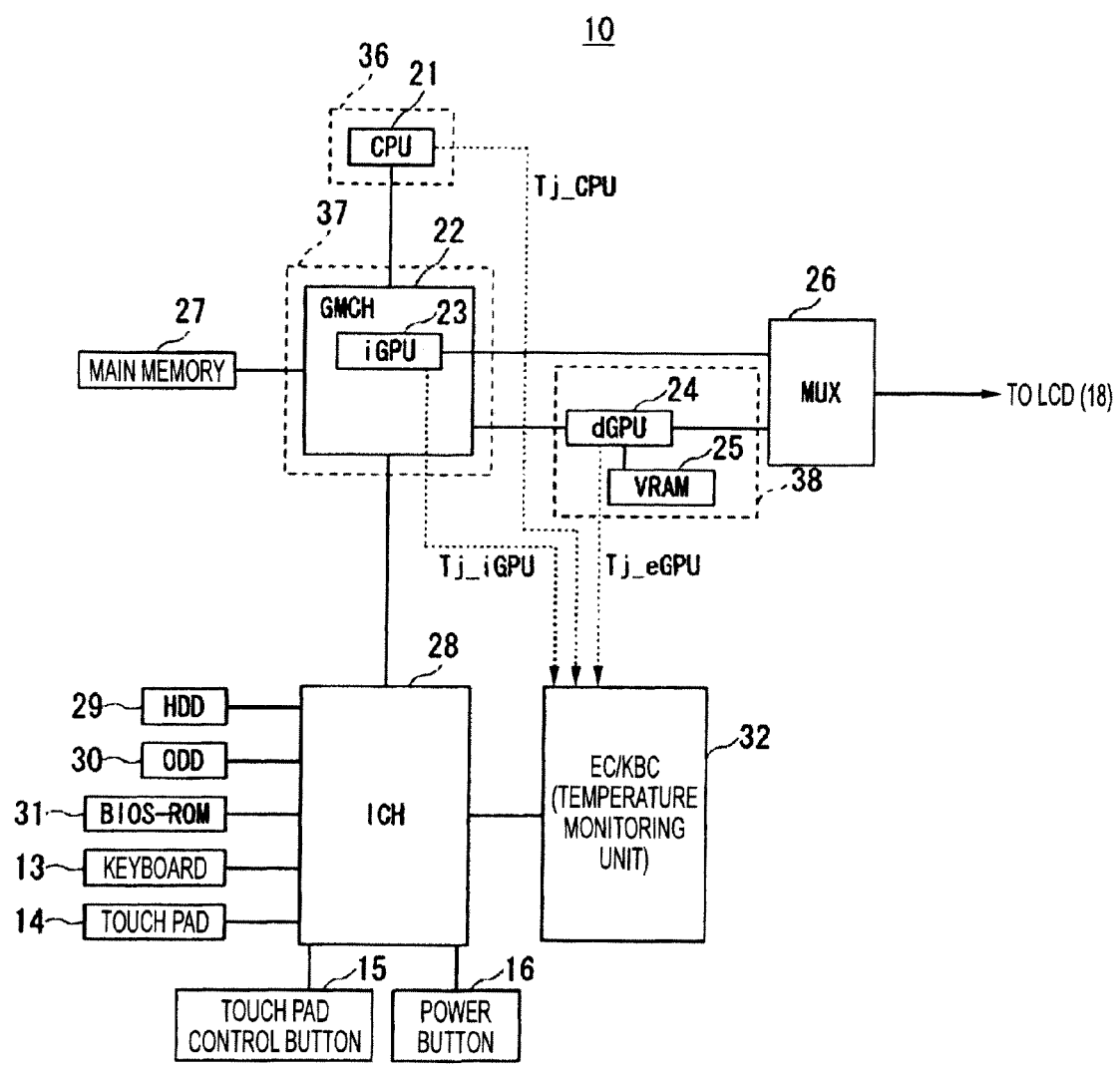
FIG. 2 illustrates an exemplary internal configuration of a personal computer according to the first embodiment.

FIG. 2 illustrates an exemplary internal configuration of the personal computer 10 according to the first embodiment.

As shown in FIG. 2, the computer main body 11 is configured by a CPU 21, a GMCH (Graphic Memory Controller Hub) in which an internal graphic controller (iGPU) 23 is integrated to an MCH (Memory Controller Hub), an external graphic controller (dGPU) 24, a multiplexer (MUX) 26, a main memory 27, an ICH (I/O Controller Hub) 28, a hard disk drive (HDD) 29, an optical disk drive (ODD) 30, a BIOS ROM 31, an embedded controller and keyboard controller IC (EC/KBC) 32, and the like. The iGPU (internal Graphic Processing Unit) 23 functions as the first processor, and the dGPU (discreet Graphic Processing Unit) 24 functions as the second processor.

A CPU cooling device 36, an iGPU cooling device 37 and a dGPU cooling device 38 are disposed near the CPU 21, the iGPU 23 and the dGPU 24.

The CPU 21 controls the processing operation of the personal computer 10 in accordance with a program that is stored in a recording medium such as the HDD 29 that can be read by the CPU 21. The CPU 21 loads a processor switching program stored in the HDD 29 and data required for executing the program into the main memory 27 and performs a process for switching the processor to perform a display control process by the processor switching program based on the temperatures of the iGPU 23 and the dGPU 24.

The GMCH 22 is configured by an IC (Integrated Circuit). This GMCH 22 is a bridge device used for connecting the dGPU 24, the main memory 27, and the ICH 28 to the CPU 21. The GMCH 22 has a function of the iGPU 23.

The iGPU 23 serves as a graphic controller that uses a required work area of the main memory 27 as a video memory. The iGPU 23 generates a video signal for forming an image to be displayed in the LCD 18 based on the image data written into the video memory by the CPU 21 and outputs the video signal to the MUX 26.

The dGPU 24 is a graphic controller having a VRAM 25 (Video Random Access Memory) as a video memory. While having the display control processing capability higher than that of the iGPU 23, the dGPU 24 has the power consumption higher than that of the iGPU 23. The dGPU 24, similarly to the iGPU 23, generates a video signal that is used for forming an image to be displayed in the LCD 18 based on the image data written into the VRAM 25 by the CPU 21 and outputs the video signal to the MUX 26.

The CPU 21 performs the switchable GPU method to control the iGPU 23 and the dGPU 24. In the switchable GPU method, the CPU 21 dynamically switch the iGPU 23 and the dGPU 24 so as to cause the iGPU 23 to perform a low-load display control process in view of the power consumption, or so as to cause the dGPU 24 to perform a high-load display control process in view of the processing speed, for example.

The multiplexer 26 is controlled by the CPU 21 through the ICH 28. The multiplexer 26 outputs either the video signal generated by the iGPU 23 or the video signal generated by the dGPU 24 to the LCD 18.

The main memory 27 as a memory unit provides a work area in which a program executed by the CPU 21 and data are temporarily stored. The main memory 27 stores at least a switch flag that indicates whether the operation of the dGPU 24 is permitted or prohibited. This switch flag is set to "enabled" in the initial state. When receiving a request for performing the display control process by using the dGPU 24 in a case where the display control process is performed by using the iGPU 23, the CPU 21 checks the switch flag. Then, when the switch flag is "enabled", the CPU 21 accepts the request, stops the operation of the iGPU 23, and causes the dGPU 24 to perform the display control process. On the other hand, when the switch flag is "disabled", the CPU 21 does not accept the request and controls the iGPU 23 to continue to perform the display control process.

For example, the switch flag may be inhibited to be set to "enabled" once being set to "disabled" unless the system ends. In this case, since the dGPU 24 is not allowed to be used carelessly until the factor causing the "disabled" switch flag is thoroughly eliminated, the occurrence of critical damage in the personal computer 10 due to problems with the dGPU 24 can be prevented.

The ICH 28 is configured by an IC (Integrated Circuit) and has a function for connecting an IDE bus, a PCI bus, a USB, and the like to other constituent elements.

The HDD 29 stores a start-up program, the operating system, the processor switching program of the personal computer 10 and various types of data needed for executing the above-described programs therein.

The HDD 29 includes a recording medium such as a magnetic recording medium, an optical recording medium, or a semiconductor memory that can be read out by the CPU 21. A part of or all of the programs and the data that are stored in the HDD 29 may be downloaded through an electronic network or may be acquired from an optical disc that is loaded in the ODD 30.

The ODD 30 performs recording and reproducing of an optical disc such as a CD or a DVD under the control of the CPU 21.

The BIOS ROM 31 stores the system BIOS therein. The system BIOS is used by the CPU 21 for controlling various hardware components of the personal computer 10.

The EC/KBC 32 (embedded controller and keyboard controller IC) controls the keyboard 13, the touch pad 14, the touch pad control button 15 and the power button 16, as operation input devices. The EC/KBC 32 is a one-chip microcomputer that monitors and controls various devices (a peripheral device, a sensor, a power source circuit, and the like) regardless of the system state of the personal computer 10.

The operating temperatures Tj (junction temperatures) of the CPU 21, the iGPU 23 (GMCH 22) and the dGPU 24 are monitored by a temperature monitoring unit that is implemented by the EC/KBC 32 or a microcomputer (including the CPU 21) similar thereto. The temperatures Tj may be monitored by polling performed by software. In any case, when the temperature Tj exceeds a given threshold value, the CPU 21 is notified of information indicating that the temperature Tj is over the threshold value in an interruption manner. Here, the temperature Tj represents the temperature of a device which is directly measured by using a PN junction on a silicon chip.

In descriptions below, an example of a case where the EC/KBC 32 serves as a temperature monitoring unit, and the temperature T1 of each processor 21 to 24 is monitored by the EC/KBC 32 will be represented (see FIG. 2).

The CPU cooling device 36, the iGPU cooling device 37 and the dGPU cooling device 38 cool the CPU 21, the iGPU 23 (GMCH 22) and dGPU 24 by an air-cooling method or a water-cooling method. In descriptions below, there will be exemplified a case where the cooling devices 36 to 38 are configured by fans and where each processor 21 to 24 is cooled by an air-cooling method.

The cooling winds generated by the cooling devices 36 to 38 cool the processors 21 to 24 so that the heat generated from the processors 21 to 24 is exhausted to the outside through the exhaust opening, which is disposed in the exhaust portion 17. The CPU 21 controls the numbers of revolutions of the cooling devices 36 to 38 based on the temperatures Tj of the processors 21 to 24.

Figure 3:
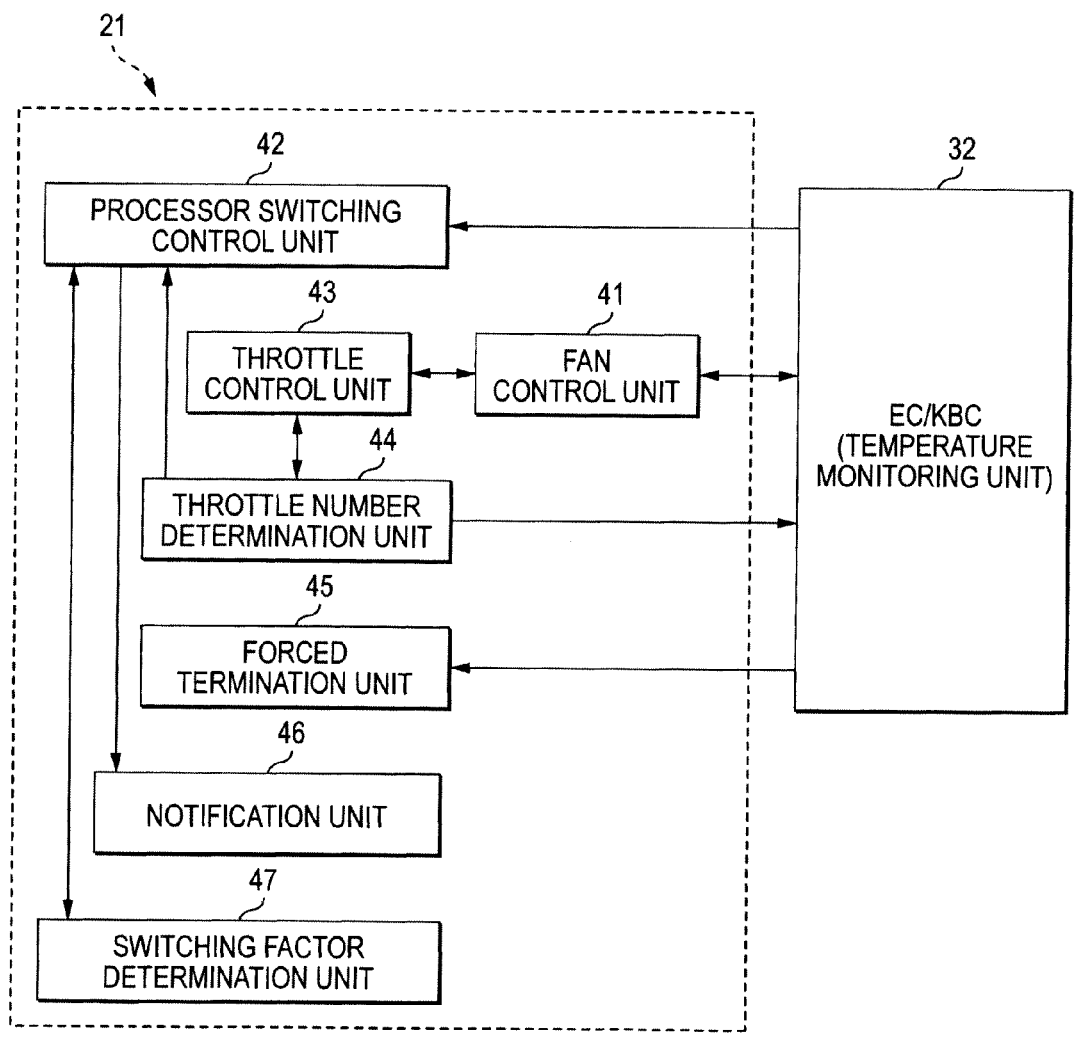
FIG. 3 illustrates a exemplary functional configuration of a function implementing unit by using a CPU.

FIG. 3 illustrates an exemplary configuration of a function implementing unit by using the CPU 21. Alternatively, the function implementing unit may be configured by hardware logic of a circuit or the like without using the CPU 21.

As shown in FIG. 3, the CPU 21 at least serves as a fan control unit 41, a processor switching control unit 42, a throttle control unit 43, a throttle number determination unit 44, a forced termination unit 45, a notification unit 46 and a switch factor determination unit 47, in accordance with the processor switching program. These units 41 to 47 use the RAM for temporary storing data.

The fan control unit 41 controls the numbers of revolutions of the cooling devices 36 to 38 based on the temperatures Tj of the processors 21 to 24.

Figure 4:
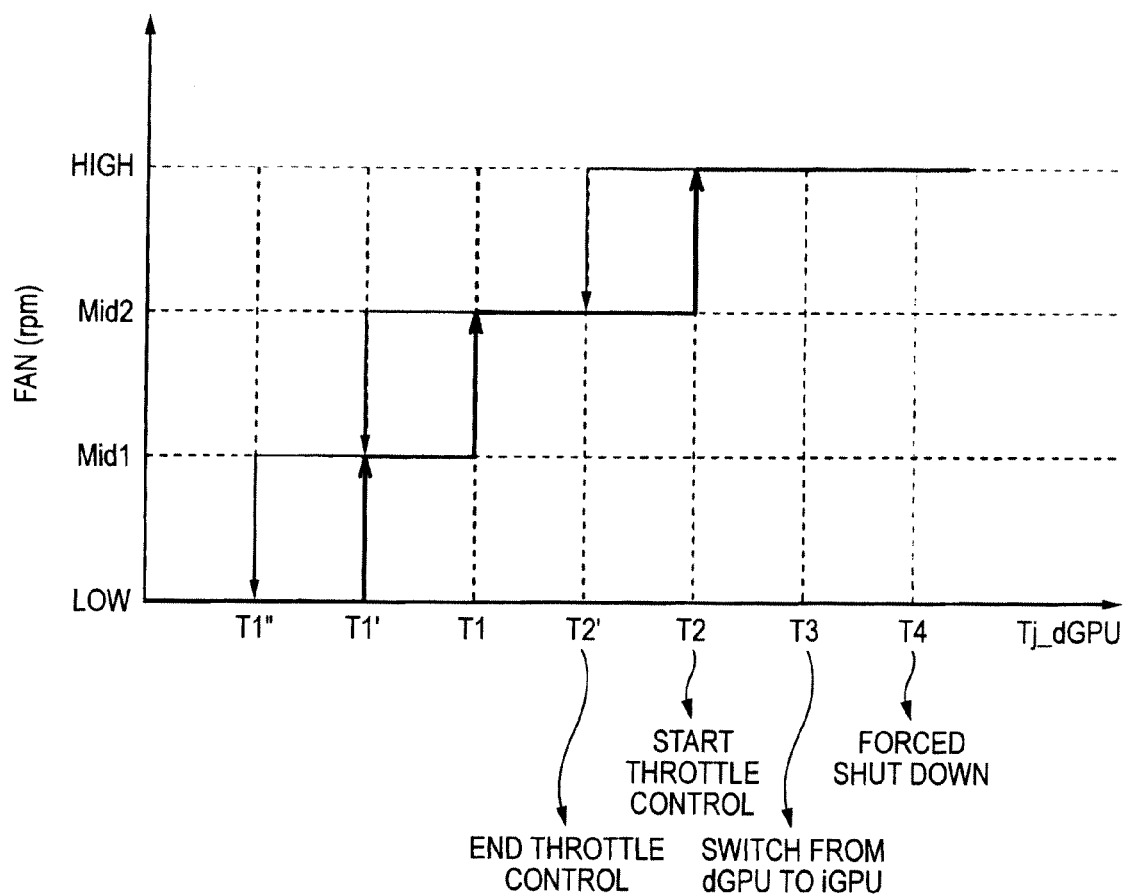
FIG. 4 illustrates the relationship between the temperature Tj_dGPU of a dGPU and the number of revolutions of a dGPU cooling device.

FIG. 4 illustrates the relationship between the temperature Tj_dGPU of the dGPU 24 and the number of revolutions of the dGPU cooling device 38. In FIG. 4 each reference sign formed by attaching a numbers to "T" represents a temperature, and the temperatures satisfies the relationship of T1"<T1'<T1<T2'<T2<T3<T4. In addition, the dGPU cooling device 38 is controlled by the fan control unit 41 and is operated at four-level numbers of the revolutions including Low (for example, 100 rpm), Mid1 (for example, 2000 rpm), Mid2 (for example, 4000 rpm), and High (for example, 5000 rpm).

An exemplary control of the number of revolutions of the dGPU cooling device 38 in accordance with the temperature Tj_dGPU of the dGPU 24 by using the fan control unit 41 will be described briefly with reference to FIG. 4.

As shown in FIG. 4, hysteresis is imparted in the relationship between the temperature Tj_dGPU of the dGPU 24 and the number of revolutions of the dGPU cooling device 38. As the hysteresis-imparted control, for example, a flag (flag for temperature T) initial set to "invalid" is used. the fan control unit 41 sets the flag for temperature T to "valid" when the temperature is over temperature T, and sets the flag for temperature T to "invalid" when the temperature is below temperature T' that is lower than T. The fan control unit 41 controls the number of revolutions of the fan such that the number of revolutions for a case where the flag for temperature T is "valid" is larger than that for a case where the flag for temperature T is "invalid" in the temperature range that is equal to or higher than T' and is lower than T.

For example, in FIG. 4, when the temperature Tj_dGPU of the dGPU 24 becomes equal to or higher than T1" from the state being sufficiently low at the time right after start of the operation of the personal computer 10, the flag for T1' stored in the main memory 27 is "invalid" (initial state), and accordingly, the number of revolutions is maintained to at Low in the range equal to or higher than T1" and lower than T1'. When the temperature Tj_dGPU of the dGPU 24 is equal to or higher than T1', the fan control unit 41 sets the number of revolutions to Mid1 and sets the flag for temperature T1' stored in the main memory 27 to "valid". Thereafter, when the temperature Tj_dGPU of the dGPU 24 falls so as to be in the range equal to or higher than T1" and lower than T1', the flag for temperature T1' is "valid", and accordingly, the number of revolutions of the fan is maintained at Mid1. Then, when the temperature Tj_dGPU of the dGPU 24 is lower than a given temperature T1", the fan control unit 41 sets the number of revolutions to Low and sets the flag for temperature T1' stored in the main memory 27 to "invalid".

As a result, even when the temperature Tj_dGPU of the dGPU 24 starts to fall after the number of revolutions becomes Mid1, the number of revolutions is maintained until the temperature Tj_dGPU of the dGPU 24 is lower than a given temperature T1". As a result, a frequent change in the number of revolutions is prevented, and a temperature can be decreased sufficiently and quickly. Similarly, also when the temperature Tj_dGPU of the dGPU 24 is equal to or higher than T1 or T2, the number of revolutions is maintained by using the flag until the temperature Tj_dGPU of the dGPU 24 is lower than T1' or T2'.

As described above, the fan control unit 41 prevents thermal runaway of the dGPU 24 in advance by controlling the number of revolutions of the dGPU cooling device 38 in accordance with the temperature Tj_dGPU of the dGPU 24.

When there is a factor for degrading of the cooling capability of the dGPU 24, such as a problem in the dGPU cooling device 38 such as an abnormality in a rotation or presence of a obstructing object in the exhaust opening of the exhaust portion 17 or an air inlet opening, the temperature Tj_dGPU of the dGPU 24 cannot be sufficiently lowered only by the air cooling using the dGPU cooling device 38. Accordingly, there are cases where the temperature Tj_dGPU of the dGPU 24 is over the rated operating temperature (for example 100° C.).

Therefore, according to this embodiment, when the temperature Tj_dGPU of the dGPU 24 is equal to or higher than a first given temperature T2 (for example, 98° C.), the information processing apparatus combinedly performs air cooling and throttling control to lower the temperature Tj_dGPU of the dGPU 24 (see T2 shown in FIG. 4). For example, as the throttling control, the frequency of the clock or the duty cycle of the integrated circuit is decreased for reducing heat generation.

In addition, the information processing apparatus according to this embodiment forcedly switches the processor to perform the display control process from the dGPU 24 to the iGPU 23 when the temperature Tj_dGPU of the dGPU 24 is equal to or higher than a given temperature T3 (for example, 99° C.) that is close to the rated operating temperature (for example, 100° C.), whereby it assuredly prevents the temperature Tj_dGPU of the dGPU 24 exceeding the rated operating temperature.

To implement the forced switching, the processor switching control unit 42 stops the operation of the dGPU 24, causes the iGPU 23 to perform the display control process, and sets the switch flag stored in the main memory 27 to "disabled" so as to prohibit the operation of the dGPU 24 thereafter when the temperature Tj_dGPU of the dGPU 24 is equal to or higher than the given temperature T3. In addition, when receiving a request for performing the display control process by using the dGPU 24 in a case where the display control process is performed by using the iGPU 23, the processor switching control unit 42 checks the switch flag. Then, when the switch flag is "disabled", the processor switching control unit 42 does not accept the request and causes the iGPU 23 to continue to perform the display control process.

The throttle control unit 43 controls the dGPU 24 such that the dGPU 24 performs throttling control at the time when the temperature Tj_dGPU of the dGPU 24 is equal to or higher than the first given temperature T2 (for example, 98° C.) other than the given temperature T3 (for example, 99° C.) in a case where the display control process is performed by the dGPU 24 and ends the throttling control at the time when the temperature Tj_dGPU of the dGPU 24 is a second given temperature T2' (for example 88° C.) lower than the first given temperature T2 (see FIG. 4).

In addition, the plural temperature threshold values may be set (for example, T2", T2''', and the like), and the throttling control may be performed by using plural duty cycles (for example, 75%, 50%, 25%, and the like).

However, in a case where the air cooling cannot be sufficiently performed due to existence of a degrading factor of the cooling capability such as an abnormality in rotation of the dGPU cooling device 38 or presence of a obstructing object in the exhaust opening of the exhaust portion 17 or the air inlet opening, the temperature Tj_dGPU of the dGPU 24 may rise again due to the completion of the throttling control even when the temperature Tj_dGPU of the dGPU 24 falls below T2' by performing the air cooling and the throttling control. In such cases, the temperature Tj_dGPU of the dGPU 24 varies in a short period, and accordingly, performing and stopping of the throttling control are repeated.

Figure 5:
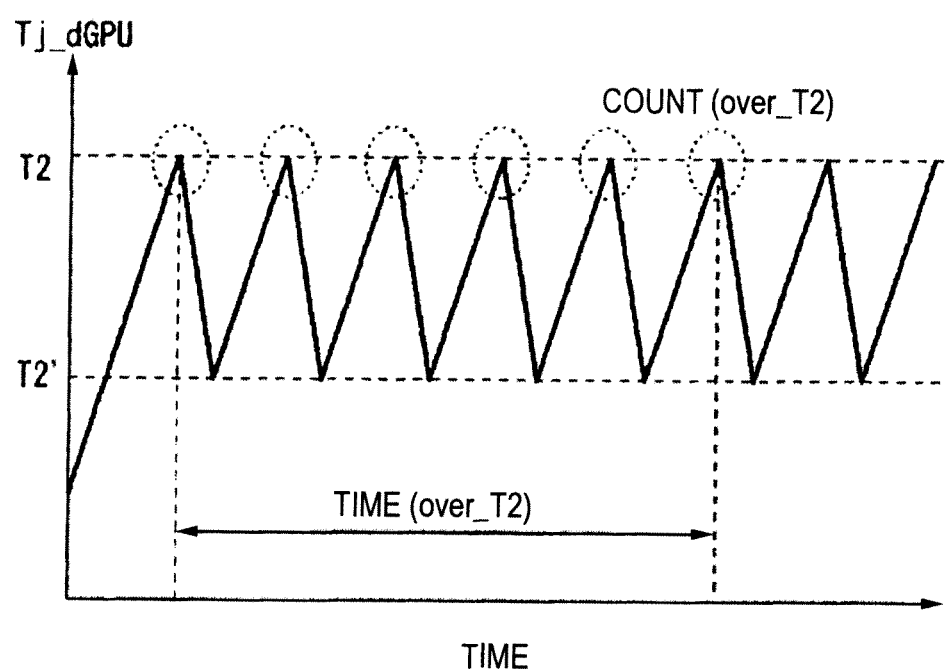
FIG. 5 illustrates an example of the temporal change in the temperature Tj_dGPU of the dGPU at the time when the throttling control is repeatedly performed.

FIG. 5 illustrates an example of the temporal change in the temperature Tj_dGPU of the dGPU 24 at the time when the throttling control is repeatedly performed.

When the throttling control is repeatedly performed, it can be predicted that air-cooling for the dGPU 24 cannot be sufficiently performed due to existence of the degrading factor of the cooling capability. In the situation that the air cooling cannot be sufficiently performed, it is preferable that the operation of the dGPU 24 is stopped for preventing the thermal runaway of the dGPU 24. Thus, when the throttling control is performed a given number of times or more within a given time interval, the throttle control unit 43 stops the operation of the dGPU 24, causes the iGPU 23 to perform the display control process, and sets the switch flag stored in the main memory 27 to "disabled" for prohibiting the operation of the dGPU 24.

The throttle number determination unit 44 determines whether the throttling control is performed a given number of times or more within a given time interval. This determination can be made, for example, by counting the number of times that the temperature Tj_dGPU of the dGPU 24 exceeds T2 within a given time interval by using the throttle control unit 43 and checking the counted number by using the throttle number determination unit 44. To perform the determination, the start time of the throttling control performed by the throttle control unit 43 may be stored in the main memory 27 so as to be used by the throttle number determination unit 44.

The forced termination unit 45 terminates the system forcedly when the temperature Tj_dGPU of the dGPU 24 is equal to or higher than T4.

Figure 6:
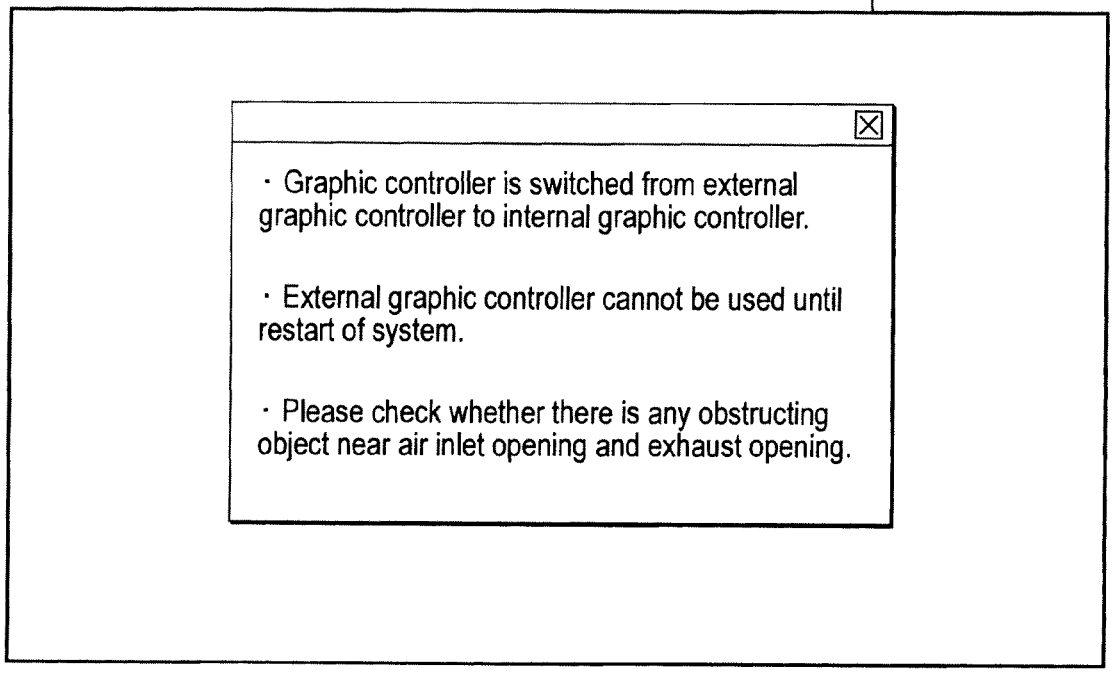
FIG. 6 illustrates an exemplary notification image that is displayed on the display screen of an LCD in an overlapping manner by a notification unit.

FIG. 6 illustrates an exemplary notification image that is displayed on the display screen of the LCD 18 in an overlapping manner by the notification unit 46.

When the processor performing the display control process is forcedly switched from the dGPU 24 to the iGPU 23 by the processor switching control unit 42 as the temperature Tj_dGPU of the dGPU 24 is equal to or higher than the given temperature T3 or the throttling control is performed a given number of times or more within a given time interval, the notification unit 46 generates a notification image having contents including the information indicating that the forced switching of the processors had been performed, the information indicating that the dGPU 24 cannot be used until restart of the system, and the information urging a check of whether there is any obstructing object near the air inlet opening and the exhaust opening and presents a user the notification image so as to be displayed on the LCD 18 in an overlapping manner through the iGPU 23. As a result, the user has a chance to notice the degrading of the cooling capability and a chance to determine the cause thereof. The information may be notified to the user, for example, by using audio or the like.

FIG. 7 illustrates an example of the switching factors from the iGPU 23 to the dGPU 24 and the switching factors from the dGPU 24 to the iGPU 23.

The switching factor determination unit 47 determines whether a switching factor for switching from the iGPU 23 to the dGPU 24 is generated while the display control process is performed by the iGPU 23. When the switching factor is generated, the switching factor determination unit 47 requests the processor switching control unit 42 to perform the display control process by using the dGPU 24. Then, the processor switching control unit 42 receives the request and checks the switch flag. When the switch flag is "enabled", the processor switching control unit 42 accepts the request, stops the operation of the iGPU 23, and causes the dGPU 24 to perform the display control process. On the other hand, when the switch flag is "disabled", the processor switching control unit 42 does not accept the request and causes the iGPU 23 to continue to perform the display control process.

As the switching factors for switching from the iGPU 23 to the dGPU 24, for example, there are switching factors A-1 to A-6 represented in FIG. 7. In particular, as the examples of the switching factors, there are a case where a switching request from a user is accepted through the operation input unit (switching factor A-1), a case where an AC adaptor is connected (switching factor A-2), a case where an application program associated with the dGPU 24 is to be executed (switching factor A-3), a case where display is output to a display device associated with the dGPU 24 (switching factor A-4), a case where the load of the display control process is increased (switching factor A-5), a case where the cooling mode of the system is changed to "performance preference" (switching factor A-6), and the like.

The switching factor A-1 is generated by accepting a switching request from a user through the operation input unit such as a keyboard 13.

The switching factor A-2 is generated for cases where an AC adaptor is connected. As a case similar to such a case, there are cases where the system is driven by a battery without an AC adaptor being connected thereto, and the remaining amount of the power of the battery is equal to or larger than a given value set in advance. Since the power consumption of the dGPU 24 is higher than that of the iGPU 23, particularly in a mobile-type information processing apparatus that is frequently driven by a battery, there is an advantage that insufficient power of the battery does not suddenly occur by using the switching factor A-2, that is, by determining whether to use the dGPU 24 based on whether the AC-adaptor is connected or the remaining power of the battery.

The switching factor A-3 is generated for a case where an application program is executed when the application program and a graphic controller to perform the display control process at the time of executing the program are associated with each other to be stored in a storage medium such as the HDD 29, and the graphic controller to perform the display control process at the time of execution of the application program is defined to be the dGPU 24.

The switching factor A-4 is generated for a case where there is plural display devices to which a video signal is output by a multiplexer such as a case where an external display device can be connected to the system. In particular, the switching factor A-4 is generated in a case where each display device and a graphic controller to perform the display control process at the time of output of display to the display device are associated with each other in advance to be stored in a storage medium such as the HDD 29, and display is output to the display device for which the display control process is defined to be performed by the dGPU 24.

The switching factor A-5 is generated for a case where the load of the display control process is increased to be equal to or larger than a given load.

The switching factor A-6 is generated for a case where there is a function for setting a cooling mode between "performance preference" and "silence preference" as one function of the operating system. For example, the switching factor A-6 is generated in a case where the cooling mode is set to "performance preference" for a case where the display control process is set to be performed by the dGPU 24 when the cooling mode is set to "performance preference".

In addition, when the display control process is performed by the dGPU 24, the switching factor determination unit 47 determines whether the switching factor for switching from the dGPU 24 to iGPU 23 is generated. When the switching factor is generated, the switching factor determination unit 47 requests the processor switching control unit 42 to perform the display control process by using the iGPU 23.

As the switching factors for switching from the dGPU 24 to the iGPU 23, for example, there are switching factors B-1 to B-8 represented in FIG. 7. In particular, as the examples of the switching factors, there is a case where a switching request from a user is accepted through the operation input unit (switching factor B-1), a case where connection to an AC adaptor is released (switching factor B-2), a case where an application program associated with the iGPU 23 is to be executed (switching factor B-3), a case where display is output to a display device associated with the iGPU 23 (switching factor B-4), a case where the load of the display control process is decreased (switching factor B-5), a case where the cooling mode of the system is "silence preference" and the temperature of the dGPU 24 is equal to or higher than the given temperature T3 (switching factor B-6), a case where the temperature of the dGPU 24 is equal to or higher than the given temperature T3 (switching factor B-7), a case where the throttling control is performed a given times or more within a given time interval (switching factor B-8), and the like.

Descriptions for the switching factors B-1 to B-5 are duplicates of the descriptions for the switching factors A-1 to A-5, and thus the descriptions are omitted here.

The switching factor B-6 can be generated in the example described below for a case where there is a function for setting a cooling mode between "performance preference" and "silence preference" as one function of the operating system, and the cooling mode is set to "silence preference".

In a case where the dGPU 24 performs the display control process and the cooling mode is set to "silence preference", for example, when the dGPU 24 is stopped before the number of revolutions of the fan of the dGPU 24 becomes High, the noise generated by the dGPU cooling device 38 at the number of revolutions of the fan of High can be prevented. In a case where the dGPU 24 is stopped before the number of revolutions of the fan of the dGPU 24 becomes High, when the cooling mode is set to "silence preference", the given temperature T3 (the temperature at which the operation of the dGPU 24 is stopped and the display control process is allowed to be performed by the iGPU 23) is configured to be lower than the first given temperature T2 (the temperature at which the throttling control is started and the number of revolutions of the fan becomes High). When T3 is lower than T2, the operation of the dGPU 24 is stopped (Tj_dGPU≥T3) before the number of revolutions of the fan becomes High (Tj_dGPU≥T2), and the display control process is performed by the iGPU 23. Accordingly, an increase in the operating sound of the fan of the dGPU cooling device 38 can be prevented. When T3 is lower than T2, switching of the processors from the dGPU 24 to the iGPU 23 can be performed as one method of cooling the dGPU 24.

In addition, in a case where T3 is lower than T2, the switch flag may be maintained to be "enabled" when the processor is switched from the dGPU 24 to the iGPU 23 due to the switching factor B-6. Because, it cannot be determined that air cooling cannot be sufficiently performed even when the temperature of the dGPU 24 is equal to or higher than the given temperature T3 (<T2).

The switching factor B-7 is generated in a case where the temperature of the dGPU 24 is equal to or high than the given temperature T3. In addition, the switching factor B-8 is generated in a case where the throttling control is performed a given number of times or more within a given time interval. When the switching factors B-7 and B-8 are generated, there is a possibility that a degrading factor of the cooling capability of the dGPU 24 is generated. Accordingly, when the switching factors B-7 and B-8 are generated, it is preferable that whether there is any degrading factor of the cooling capability of the dGPU 24 is checked and the operation of the dGPU 24 is prohibited until the factor is eliminated in a case where there is the degrading factor. Therefore, the switching factors B-7 and B-8 can be regarded as forced switching factors.

Accordingly, when the switching factors B-7 and B-8 are generated, that is, when a forced switching factor is generated based on the temperature of the dGPU 24, the switch flag is set to "disabled" by the processor switching control unit 42, and a notification image having the contents including information indicating that the processor is forcedly switched to the iGPU 23 by the notification unit 46 and information for urging to check a obstructing object is displayed on the LCD 18 in an overlapping manner.

Next, an example of the operation of the information processing apparatus according to this embodiment will be described.

Figure 8:
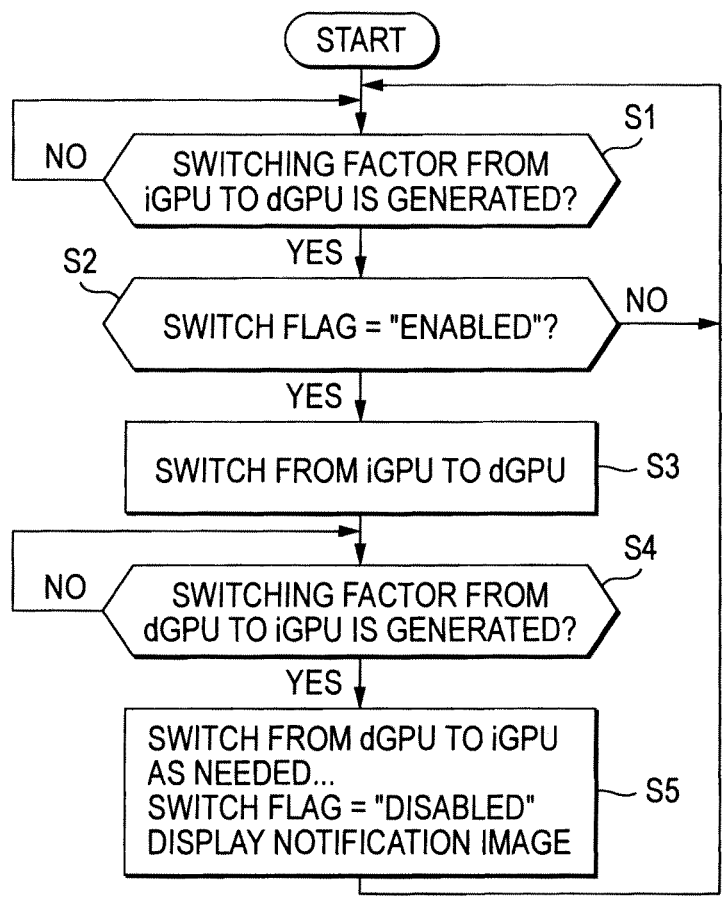
FIG. 8 illustrates an exemplary procedure for the CPU of the personal computer represented in FIG. 1 to control the iGPU and the dGPU such that one of the iGPU and the dGPU is caused to perform the display control process by dynamically switching between the iGPU and the dGPU as needed by using the switchable GPU method.

FIG. 8 illustrates an exemplary procedure for the CPU 21 of the personal computer 10 represented in FIG. 1 to control the iGPU 23 and the dGPU 24 such that one of the iGPU 23 and the dGPU 24 is caused to perform the display control process by dynamically switching between the iGPU 23 and the dGPU 24 as needed by using the switchable GPU method. In FIG. 8, each reference sign formed by attaching a number to "S" denotes a step in the flowchart.

This procedure is started in a state in which a display control process is performed by the iGPU 23. It is assumed that the switch flag is set to "enabled".

In Step S1, the switching factor determination unit 47 determines whether any switching factor (see FIG. 7) for switching from the iGPU 23 to the dGPU 24 is generated. When the switching factor is generated, the switching factor determination unit 47 requests the processor switching control unit 42 to perform the display control process by using the dGPU 24, and the process proceeds to Step S2. On the other hand, when any switching factor is not generated, the switching factor determination unit 47 continuously monitors the generation of any switching factor.

In Step S2, the processor switching control unit 42 determines whether the switch flag is "enabled". When the switch flag is "enabled", the process proceeds to Step S2. On the other hand, when the switch flag is "disabled", the process switching control unit 42 does not accept the request from the switching factor determination unit 47, and the process proceeds back to Step S1.

In Step S3, the processor switching control unit 42 stops the operation of the iGPU 23 and causes the dGPU 24 to perform the display control process.

In Step S4, the switching factor determination unit 47 determines whether any switching factor for switching from the dGPU 24 to the iGPU 23 is generated. When the switching factor is generated, the switching factor determination unit 47 requests the processor switching control unit 42 to cause the iGPU 23 to perform the display control process, and the process proceeds to Step S5. On the other hand, when any switching factor is not generated, the switching factor determination unit 47 continuously monitors the generation of the switching factor.

In Step S5, the processor switching control unit 42 stops the operation of the dGPU 24 and causes the iGPU 23 to perform the display control process. In addition, when the switching factor is B-7 or B-8, the switch flag is set to "disabled" by the processor switching control unit 42, and a notification image having the contents including information indicating that the switching to the iGPU 23 is forcedly performed by the notification unit 46 is disposed on the LCD 18 in an overlapping manner.

Based on the above-described procedure, the iGPU 23 and the dGPU 24 can be controlled such that one of the iGPU 23 and the dGPU 24 performs the display control process by dynamically switching between the iGPU 23 and the dGPU 24 as needed by using the switchable GPU method.

The procedure represented in FIG. 8 ends when there is a user's direction for ending the system through the operation input unit such as a keyboard 13.

Figure 9:
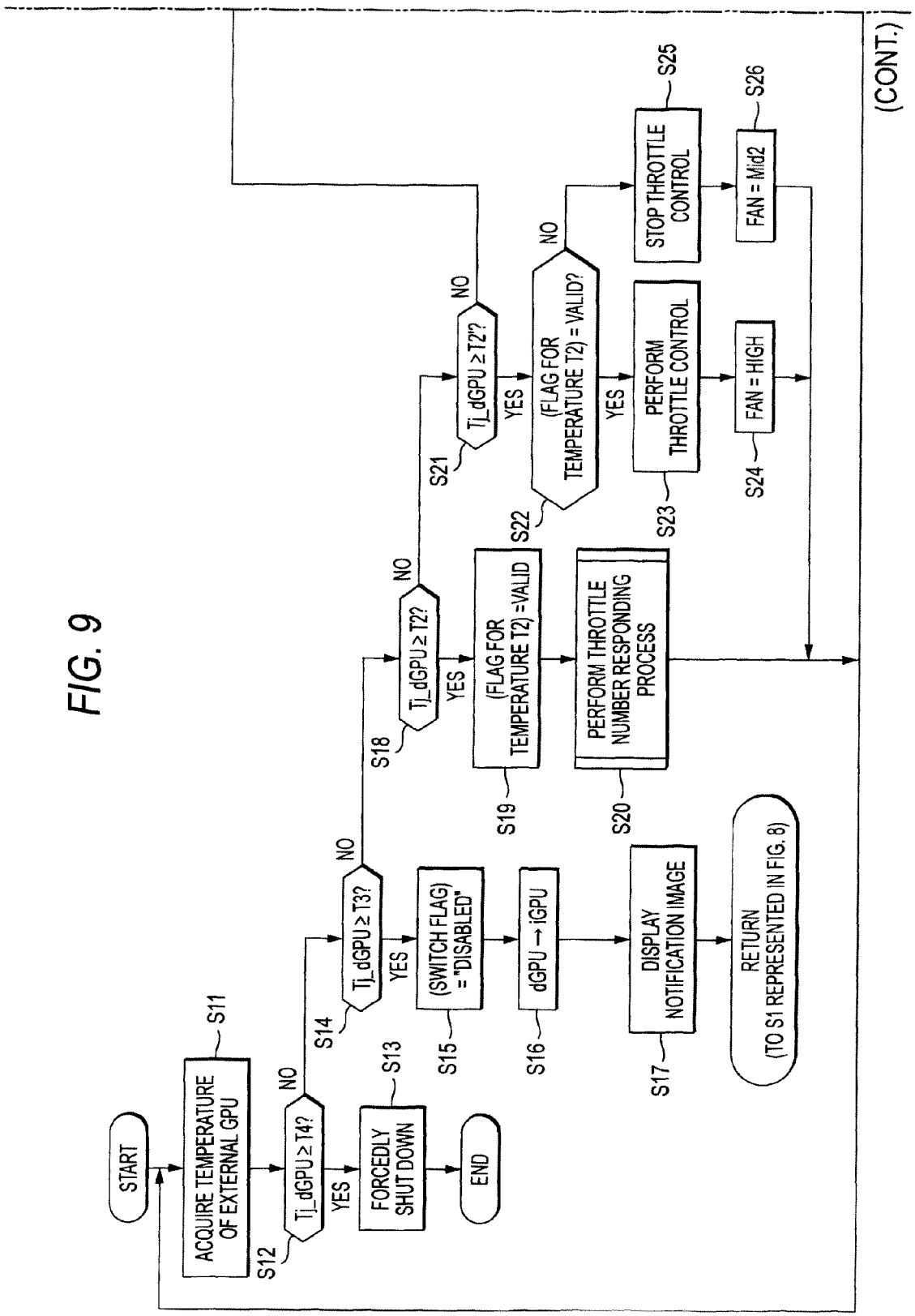
FIG. 9 illustrates an exemplary procedure at the time when the processor to perform the display control process is forcedly switched from the dGPU to the iGPU in a case where a forced switching factor is generated based on the temperature of the dGPU.

FIG. 9 illustrates an exemplary procedure at the time when the process to perform the display control process is forcedly switched from the dGPU 24 to the iGPU 23 in a case where a forced switching factor (see B-7 and B-8 represented in FIG. 7) is generated based on the temperature of the dGPU 24. In FIG. 9, each reference sign formed by attaching a number to "S" denotes a step in the flowchart.

This procedure describes a detailed operation out of the operation that is performed in Step S4 represented in FIG. 8, which is performed particularly in a case where a forced switching factor (see B-7 and B-8 represented in FIG. 7) is generated based on the temperature of the dGPU 24.

This procedure is started in a state in which the cooling mode is set to "performance preference", the display control process is performed by the dGPU 24, and the given temperature T3 is configured to be higher than the first given temperature T2. It is assumed that the switch flag is set to "enabled". This procedure will be described based on the exemplary case where the temperature Tj_dGPU of the dGPU 24 and the number of revolutions of the dGPU cooling device 38 satisfy the relationship represented in FIG. 4.

First, in Step S11, the temperature monitoring unit of the EC/KBC 32 acquires the temperature Tj_dGPU of the dGPU 24.

Next, in Step S12, the temperature monitoring unit 32 determines whether Tj_dGPU is equal to or higher than T4. When Tj_dGPU≥T4, the process proceeds to Step S13. On the other hand, when Tj_dGPU<T4, the process proceeds to Step S14.

Next, in Step S13, the forced termination unit 45 is noticed of the information indicating Tj_dGPU_T4 from the temperature monitoring unit 32 through an interrupt and terminates (shutdown) the system forcibly, and a series of the procedure ends.

Based on the procedure of Steps S11 to S13, by forcedly shutting down the system in a case where the Tj_dGPU is equal to or higher than T4, occurrence of critical damages in the personal computer 10 due to the problem of the dGPU 24 can be prevented.

On the other hand, when it is determined that Tj_dGPU<T4 in Step S12, the temperature monitoring unit 32 determines whether Tj_dGPU is equal to or higher than T3 in Step S14. When Tj_dGPU≥T3, the process proceeds to Step S5 represented in FIG. 8. The operation performed in Step S5 represented in FIG. 8 will be described in details in the following Steps S15 to S17. Then, the process proceeds to Step S15. On the other hand, when Tj_dGPU<T3, the process proceeds to Step S18.

Next, in Step S15, the processor switching control unit 42 is notified of the information indicating Tj_dGPU≥T3 from the temperature monitoring unit 32 through an interrupt and sets the switch flag, which is used for prohibiting the operation of the dGPU 24 performed thereafter, to "disabled".

Next, in Step S16, the processor switching control unit 42 stops the operation of the dGPU 24 and causes the iGPU 23 to perform the display control process.

Next, in Step S17, the notification unit 46 generates a notification image having contents including the information indicating the forced switching of the processor to perform the display control process from the dGPU 24 to the iGPU 23, the information indicating that the dGPU 24 cannot be used until restart of the system, and the information for urging to check whether there is any obstructing object near the air inlet opening and the exhaust opening and displays the notification image (see FIG. 6) on the LCD 18 in an overlapping manner through the iGPU 23, and the process proceeds back to Step S1 represented in FIG. 8.

Here, Steps S15 to S17 are for describing the operation performed in Step S5 represented in FIG. 8 in details.

Based on the procedure of Steps S14 to S17, by forcedly switching the processors to perform the display control process from the dGPU 24 to the iGPU 23 when the Tj_dGPU is equal to or higher than the given temperature T3 (when the forced switching factor B-7 is generated in accordance with the temperature of the dGPU 24), the problem due to overheat of the dGPU 24 can be prevented. In addition, the user can check whether there is any obstructing object near the air inlet opening and the exhaust opening by receiving the notification image (see FIG. 6) through the LCD 18. Then, when there is a degrading factor of the cooling capability, the user can use the personal computer 10 again without any problem by determining and solving the factor and restarting the system.

On the other hand, when it is determined that Tj_dGPU<T3 in Step S14, the temperature monitoring unit 32 determines whether Tj_dGPU is equal to or higher than T2 in Step S18. When Tj_dGPU≥T2, the process proceeds to Step S19. On the other hand, when Tj_dGPU<T2, the process proceeds to Step S21.

Next, in Step S19, the fan control unit 41 is notified of the information indicating Tj_dGPU≥T2 through an interrupt from the temperature monitoring unit 32 and sets the flag for temperature T2 stored in the main memory 27, to "valid".

Next, in Step S20, the CPU 21 performs a process (hereinafter, referred to as a throttle number responding process) for forcedly switching the processors to perform the display control process from the dGPU 24 to the iGPU 23 for a case where the throttling control is performed a given number of times or more within a given time interval.

When the throttling control is performed the given number of times or more in the given time interval based on the procedure of Steps S18 to S20, the problem due to overheating of the dGPU 24 can be prevented by forcedly switching the processors to perform the display control process from the dGPU 24 to the iGPU 23.

On the other hand, when it is determined that Tj_dGPU<T2 in Step S18, the temperature monitoring unit 32 determines whether Tj_dGPU is equal to or higher than T2' in Step S21. When Tj_dGPU≥T2', the process proceeds to Step S22. On the other hand, when Tj_dGPU<T2', the process proceeds to Step S27.

Next, in Step S22, the fan control unit 41 is notified of the information indicating Tj_dGPU≥T2' through an interrupt from the temperature monitoring unit 32 and determines whether the flag for temperature T2 is "valid".

When the flag for temperature T2 is "valid" (YES in Step S22), the throttle control unit 43 performs throttling control (Step S23), and the fan control unit 41 rotates the fan of the dGPU cooling device 38 at the number of revolutions of High (Step S24). In addition, in Step S23, when the throttling control has been performed already, the throttle control unit 43 continues to perform the throttling control.

On the other hand, when the flag for temperature T2 is "invalid" (NO in Step S22), the throttle control unit 43 stops the throttling control (Step S25), and the fan control unit 41 rotates the fan of the dGPU cooling device 38 at the number of revolutions of Mid2 (Step S26). In addition, in Step S25, when the throttling control has already been stopped, the throttle control unit 43 maintains to be in the state in which the throttling control is stopped.

On the other hand, when it is determined Tj_dGPU<T2' in Step S21, the fan control unit 41 sets the flag for temperature T2 to "invalid" in Step S27.

Next, in Step S28, the temperature monitoring unit 32 determines whether Tj_dGPU is equal to or higher than T1. When Tj_dGPU≥T1, the process proceeds to Step S29. On the other hand, when Tj_dGPU<T1, the process proceeds to Step S31.

Next, in Step S29, the fan control unit 41 is noticed of the information indicating Tj_dGPU≥T1 from the temperature monitoring unit 32 through an interrupt and sets the flag for temperature T1 to "valid".

Next, in Step S30, the fan control unit 41 rotates the fan of the dGPU cooling device 38 at the number of revolutions of Mid2.

On the other hand, when it is determined Tj_dGPU<T1 in Step S28, the temperature monitoring unit 32 determines whether Tj_dGPU is equal to or higher than T1' in Step S31. When Tj_dGPU≥T1', the process proceeds to Step S32. On the other hand, when Tj_dGPU<T1', the process proceeds to Step S36.

Next, in Step S32, the fan control unit 41 is notified of the information indicating Tj_dGPU≥T1' through an interrupt from the temperature monitoring unit 32 and determines whether the flag for temperature T1 is "valid".

When the flag for temperature T1 is "valid" (YES in Step S32), the fan control unit 41 rotates the fan of the dGPU cooling device 38 at the number of revolutions of Mid2 (Step S33).

On the other hand, when the flag for temperature T1 is "invalid" (NO in Step S32), the fan control unit 41 sets the flag for T1' to "valid" (Step S34) and rotates the fan of the dGPU cooling device 38 at the number of revolutions of Mid1 (Step S35).

On the other hand, when it is determined Tj_dGPU<T1' in Step S31, the fan control unit 41 sets the flag for temperature T1 to "invalid" in Step S36.

Next, in Step S37, the temperature monitoring unit 32 determines whether Tj_dGPU is equal to or higher than T1". When Tj_dGPU≥T1", the process proceeds to Step S38. On the other hand, when Tj_dGPU<T1", the process proceeds to Step S40.

Next, in Step S38, the fan control unit 41 is noticed of the information indicating Tj_dGPU≥T1" from the temperature monitoring unit 32 through an interrupt and determines whether the flag for temperature T1' is "valid". When the flag for temperature T1' is "valid", the process proceeds to Step S39. On the other hand, when the flag for temperature T1' is "invalid", the process proceeds to Step S41.

Next, in Step S39, the fan control unit 41 rotates the fan of the dGPU cooling device 38 at the number of revolutions of Mid1.

On the other hand, when it is determined Tj_dGPU<T1" in Step S37, the fan control unit 41 is notified of the information indicating Tj_dGPU<T1" from the temperature monitoring unit 32 through an interrupt in Step S40 and sets the flag for temperature T1' to "invalid".

Next, in Step S41, the fan control unit 41 rotates the fan of the dGPU cooling device 38 at the number of revolutions of Mid1.

Based on the procedure of Steps S21 to S41, the hysteresis can be provided in the relationship between the Tj_dGPU and the number of revolutions of the dGPU cooling device 38 by using the flag for temperature T. Accordingly, frequent changes in the number of revolutions can be prevented, and a sufficient temperature drop can be assuredly achieved in a speedy manner.

Subsequently, the procedure of performing the throttle number responding process for forcedly switching the processor to perform the display control process from the dGPU 24 to the iGPU 23 for a case where the throttling control is performed a given number of times or more within a given time interval will be described.

Figure 10:
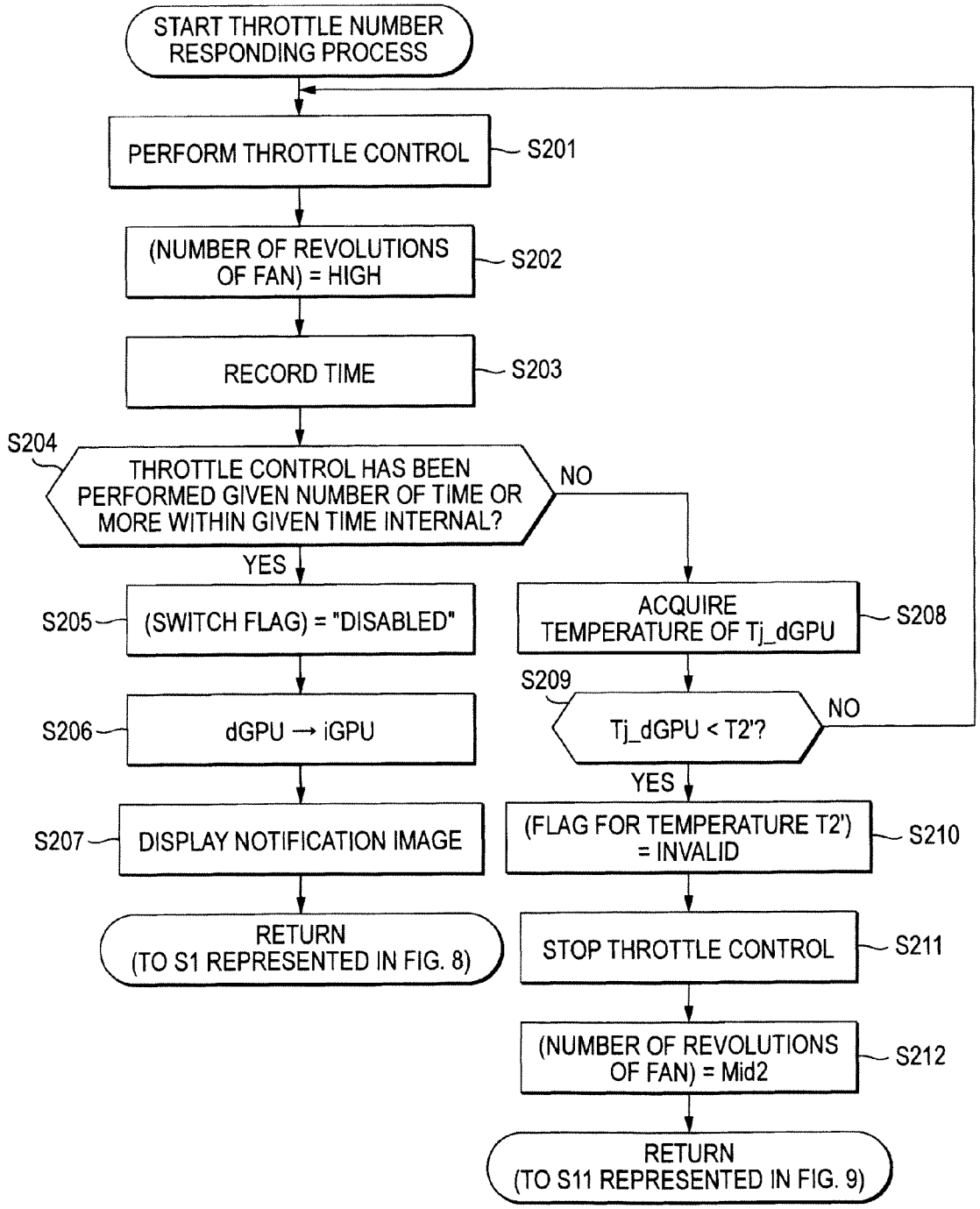
FIG. 10 illustrates an exemplary subroutine that represents the procedure of a throttle number responding process performed by the CPU in Step S20 represented in FIG. 9.

FIG. 10 illustrates an exemplary subroutine that represents the procedure of the throttle number responding process performed by the CPU 21 in Step S20 represented in FIG. 9. In FIG. 10, each reference sign formed by attaching a number to "S" denotes a step in the flowchart.

At the start of this procedure, the temperature Tj_dGPU of the dGPU 24 satisfies the relationship of Tj_dGPU≥T2 (YES in Step S18 represented in FIG. 9), and the flag for temperature T2 is set to "valid" (Step S19 represented in FIG. 9).

In Step S201, the throttle control unit 43 performs the throttling control for the dGPU 24 (for example, setting the duty cycle to 50% or the like). In addition, when the throttling control has been already performed, the throttle control unit 43 continues to perform the throttling control.

Next, in Step S202, the fan control unit 41 rotates the fan of the dGPU cooling device 38 at the number of revolutions of High.

Next, in Step S203, the throttle control unit 43 stores the current time in the required work area of the main memory 27 as the start time of performing the throttling control.

Next, in Step S204, the throttling number determination unit 44 determines whether the throttling control is performed the given number of times or more within the given time interval based on the time recorded in the required work area of the main memory 27. For example, when the given time interval is ten minutes and the given number of times is five times, the throttling number determination unit 44 acquires the number of times included in the past for ten minutes from the current time out of the times recorded in the required work area of the main memory 27 and determines whether the acquired number is equal to or larger than five.

When the throttling control is performed the given number of times or more within the given time interval, the process proceeds to Step S5 represented in FIG. 8. The operation performed in Step S5 represented in FIG. 8 will be described in detail in Steps S205 to S207. On the other hand, when the throttling control is not performed the given times or more within the given time interval, the process proceeds to Step S207.

Next, in Step S205, the processor switching control unit 42 sets the switch flag to "disabled" so as to prohibit the operation of the dGPU 24 performed thereafter.

Next, in Step S206, the processor switching control unit 42 stops the operation of the dGPU 24 and causes the iGPU 23 to perform the display control process.

Next, in Step S207, the notification unit 46 generates a notification image having contents including the information indicating the forced switching of the processor to perform the display control process from the dGPU 24 to the iGPU 23, the information indicating that the dGPU 24 cannot be used until restart of the system, and the information for urging to check whether there is any obstructing object near the air inlet opening and the exhaust opening and displays the notification image (see FIG. 6) on the LCD 18 in an overlapping manner through the iGPU 23, and the process proceeds back to Step S1 represented in FIG. 8.

Here, Steps S205 to S207 are for describing the operation performed in Step S5 represented in FIG. 8 in details.

On the other hand, when it is determined that the throttling control has not been performed the given number of times or more within the given time interval in Step S204, the temperature monitoring unit 32 acquires the Tj_dGPU in Step S208.

Next, in Step S209, the temperature monitoring unit determines whether Tj_dGPU is lower than T2'. When Tj_dGPU≥T2', the process proceeds back to Step S201, and the throttling control is continued to be performed. On the other hand, when Tj_dGPU<T2', the process proceeds to Step S210.

Next, in Step S210, the fan control unit 41 sets the flag for temperature T2 to "invalid".

Next, in Step S211, the throttle control unit 43 stops the throttling control in Step S211.

Next, in Step S212, the fan control unit 41 rotates the fan of the dGPU cooling device 38 at the number of revolutions of Mid2, and the process proceeds back to Step S11 represented in FIG. 9.

Based on the above-described procedure, when the throttling control is performed the given number of times or more within the given time interval, the processor to perform the display control process can be forcedly switched from the dGPU 24 to the iGPU 23.

The information processing apparatus according to this embodiment can stop the operation of the dGPU 24 so as to cause the iGPU 23 to perform the display control process and prohibit the operation of the dGPU 24 to be performed thereafter in a case where there is a degrading factor of the cooling capability of the dGPU 24 such as a case where the rise in the temperature Tj_dGPU of the dGPU 24 is detected or a case where the throttling control is performed the given number of times or more within the given time interval. Accordingly, even when there is a user's direction for switching the processor to the dGPU 24, the process performed by the iGPU 23 can be continued without accepting the direction. Therefore, according to this information processing apparatus, the dGPU 24 is not carelessly allowed to perform the process in a case where there is a degrading factor of the cooling capability of the dGPU 24. As a result, even in a state in which the temperature of the dGPU 24 rises over the considered range due to a decrease or degrading of the cooling capability, the use under the environment at the temperature beyond the considered range, or the like, the thermal runaway of the dGPU 24 can be prevented in advance so as to be used safely.

In addition, the information processing apparatus according to this embodiment can display the notification image having contents including the information indicating the forced switching of the processor from the dGPU 24 to the iGPU 23, the information indicating that the dGPU 24 cannot be used until restart of the system, and the information urging a check of whether there is any obstructing object near the air inlet opening and the exhaust opening on the LCD 18 in a case where the processor to perform the display control process is forcedly switched from the dGPU 24 to the iGPU 23. The user can notice the fact that the cooling capability is decreased in an easy manner by checking the above-described notification image and has a chance to determine the factor thereof. Therefore, according to this information processing apparatus, the user can assuredly check whether there is any obstructing object near the air inlet opening and the exhaust opening in a case where there is the degrading factor of the cooling capability of the dGPU 24 and can use the information processing apparatus again without any problem by restarting the system after determining and solving the factor.

Figure 11:
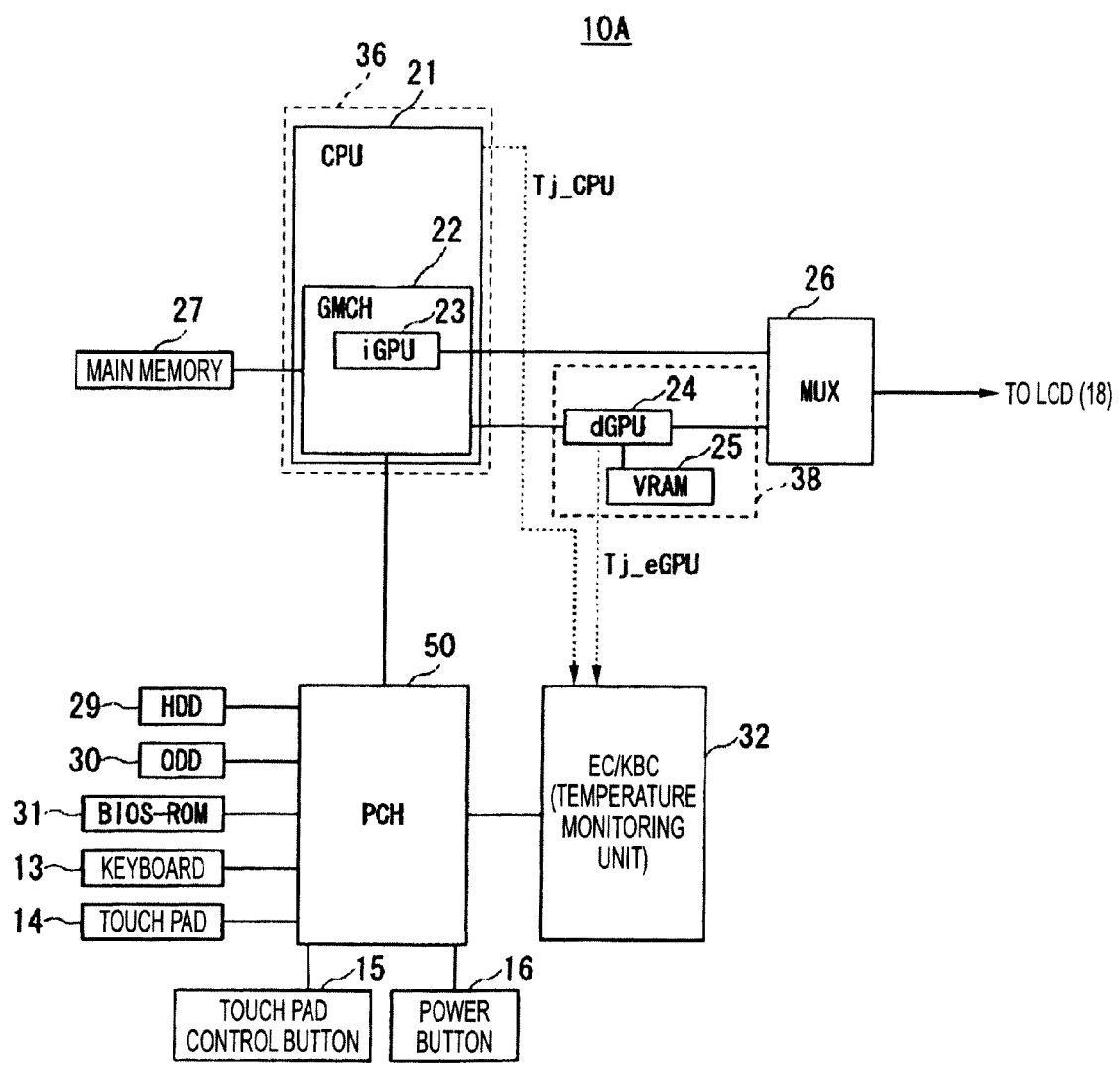
FIG. 11 illustrates an exemplary internal configuration of a personal computer according to the second embodiment.

FIG. 11 illustrates an exemplary internal configuration of a personal computer 10A according to the second embodiment. Only the configuration of the personal computer 10A represented in FIG. 11, in which the function as the GMCH 22 is included in the CPU 21 and the ICH 28 is replaced by the PCH 50 (Platform Controller Hub), is different from that of the personal computer 10 represented in FIG. 1. Other configurations and operations are not substantially different from those of the personal computer 10 represented in FIG. 1. Thus, a same reference symbol is assigned to each configuration that is the same as that of the personal computer 10, and a description thereof is omitted here.

The CPU 21 controls the processing operation of the personal computer 10 in accordance with a program that is stored in a recording medium such as the HDD 29 that can be read by the CPU 21. The CPU 21 loads a processor switching program stored in the HDD 29 and data required for executing the program into the main memory 27 and performs a process for switching the processor to perform a display control process in accordance with the processor switching program based on the temperatures of the iGPU 23 and the dGPU 24.

The CPU 21 has a function as an MCH (bridge device) for connecting the dGPU 24, the main memory 27, and the PCH 50 together and a function as the iGPU 23. In addition, the PCH 50 at least has a function as an ICH 28.

According to the personal computer 10A of this embodiment, the same advantages as those of the personal computer 10 of the first embodiment can be acquired.

The present invention is not limited to the above-described embodiments. Thus, in practical applications, the present invention may be embodied by changing the constituent elements in the scope not departing from the basic idea thereof. In addition, various inventions may be formed by appropriately combining the plural constituent elements disclosed in the above-described embodiments. For example, out of all the constituent elements represented in the embodiments, several constituent elements may be eliminated. In addition, the constituent elements from different embodiments may be combined appropriately.

For example, the present invention may be applied to various information processing apparatuses other than the notebook personal computer 10 described in this embodiment. In particular, the present invention may be appropriately applied to an information processing apparatus such as a television set that performs a display control process.

In the above-described embodiments, examples for a case where the graphic controller (GPU) is used as a processor have been described. However, the processor of the information processing apparatus according to the present invention is not limited to the graphic controller. Thus, the present invention may be applied to various processors such as CPUs and processors for implementing the high image quality.

In addition, the plural processors of the information processing apparatus needs not to be formed as separate bodies. For example, in a case where one processor is constituted by plural sub processors, and the plural sub processors selectively performs an information process, the embodiments can be applied to the case by treating the plural sub processors as the plural processors.

In addition, in the information processing apparatus according to the above-described embodiments, the temperature Tj of the graphic controller may be used as an index of the load of the graphic controller. The information processing apparatus according to the above-described embodiments includes the temperature monitoring unit 32 that monitors the temperatures Tj of the iGPU 23 (the CPU 21 of the second embodiment) and the dGPU 24. Accordingly, the temperatures Tj of the iGPU 23 (the CPU 21 of the second embodiment) and the dGPU 24 can be acquired in an easy manner. The temperature Tj as the index of the load can be used for determining the generation of the switching factors A-5 and B-5 represented in FIG. 7.

In particular, in a case where the display control process is performed by the iGPU 23, when the temperature Tj_iGPU of the iGPU 23 is equal to or higher than a given temperature, the load is determined to have been increased so as to switch to the dGPU 24 (generation of the switching factor A-5). In addition, in a case where the display control process is performed by the dGPU 24, when the temperature Tj_dGPU of the dGPU 24 is lower than a given temperature, the load is determined to have been decreased so as to switch to the iGPU 23 (generation of the switching factor B-5).

Generally, it is difficult to measure the load of the processor quantitatively. Thus, by using the temperature Tj as the index of the load as described above, switching can be performed by utilizing the characteristics of the GPUs 23 and 24. Accordingly, the power consumption of the entire system and the processing speed can be balanced more appropriately.

In the above-described embodiments, the steps shown in the flowchart represent an exemplary processes that are performed in a time series in the described order. However, the steps may not necessarily be performed in a time series. Thus, the steps may be performed in parallel or independently.

The information processing apparatus according to the present invention includes plural processors and can switch the processor to perform the information process among the plural processors in accordance with the temperatures of the processors.

What is claimed is:

1. An information processing apparatus comprising:
   a first processor;
   a second processor having information processing capability and a power consumption greater than the first processor;
   a temperature monitoring module configured to acquire an operating temperature of the second processor;
   a processor switching control module configured to perform, when the operating temperature of the second processor is equal to or higher than a first temperature:
      stopping an operation of the second processor,
      causing the first processor to perform an information process, and
      prohibiting the operation of the second processor;
   a throttle control module configured to perform, when the information process is performed by the second processor:
      executing a throttling control for the second processor when the operating temperature of the second processor is higher than a second temperature that is different from the first temperature, and
      ending the throttling control when the operating temperature of the second processor becomes a third temperature that is lower than the second temperature; and
   a throttle number determination module configured to determine whether the throttling control is performed at least a prescribed number of times within a prescribed time interval, wherein the prescribed number of times corresponding to a number of non-continuous occurrences that the operating temperature of the second processor has exceeded the second temperature,
   wherein the processor switching control module performs, when the throttling control is performed the at least prescribed number of non-continuous times within the prescribed time interval:
      stopping the operation of the second processor,
      causing the first processor to perform the information process, and
      prohibiting the operation of the second processor.

2. The information processing apparatus of claim 1,
   wherein the processor switching control module performs, when the operating temperature of the second processor is equal to or higher than the first temperature:
      stopping the operation of the second processor,
      causing the first processor to perform the information process,
      setting a switch enablement flag stored in a storing module to "disabled" for prohibiting the operation of the second processor, and
      upon receiving a request for performing the information process by the second processor when the first processor performs the information process, checking the switch enablement flag to refuse the request when the switch enablement flag is "disabled", causing the first processor to continue the information process, thereby controlling the first processor and the second processor.

3. The information processing apparatus of claim 1, further comprising:
a setting module configured to set a "performance preference" mode or a "silence preference" mode as a cooling mode for the system,
wherein the first temperature at which the processor switching control module performs stopping the operation of the second processor and causing the first processor to perform the information process is configured by the setting module to be lower than the second temperature at which the throttle control module performs executing the throttling control when the cooling mode is set to the "silence preference" mode and the first temperature is configured by the setting module to be higher than the second temperature when the cooling mode is set to the "performance preference" mode.

4. The information processing apparatus of claim 1,
wherein the first processor is a first graphic controller configured to perform a display control process, and
wherein the second processor is a second graphic controller having a display control processing capability and the power consumption higher than those of the processor.

5. The information processing apparatus of claim 2,
wherein the processor switching control module performs, when the first processor performs the information process, upon receiving the request for performing the information process by the second processor from the user through a manipulation input device, checking the switch enablement flag to refuse the request when the switch enablement flag is "disabled", causing the first processor to continue the information process, thereby controlling the first processor and the second processor.

6. The information processing apparatus of claim 2,
wherein the switch enablement flag is, when having been set to "disabled" once, cleared only when the system is restarted or shut down.

7. The information processing apparatus of claim 3, further comprising:
a display module configured to display an image based on a video signal generated by either of the first graphic controller or the second graphic controller; and
a notification module configured to cause, when the processor switching control module prohibits the operation of the second graphic controller, the display module through the first graphic controller to superimposedly display a notification image including a content indicating that information.

8. The information processing apparatus of claim 1, wherein the processor switching control module performs, when an alternating current (AC) adaptor is disconnected from the information processing apparatus:
stopping the operation of the second processor,
causing the first processor to perform the information process, and
prohibiting the operation of the second processor.

9. The information processing apparatus of claim 1,
wherein the processor switching control module performs, when a program associated with the first processor is to be executed:
stopping the operation of the second processor,
causing the first processor to perform the information process, and
prohibiting the operation of the second processor.

10. The information processing apparatus of claim 1,
wherein the processor switching control module performs, when a load of a display control process currently performed by the second processor is decreased:
stopping the operation of the second processor,
causing the first processor to perform the display control process, and
prohibiting the operation of the second processor.

11. An information processing apparatus comprising:
a first processor;
a second processor having greater information processing capability and power consumption than the first processor;
a temperature monitoring unit configured to acquire an operating temperature of the second processor;
a throttle number determination unit configured to determine whether a throttling control is performed at least a prescribed number of non-continuous times within a time interval;
a processor switching control unit configured to perform, when the throttling control is performed at least the prescribed number of times within the time interval representing the prescribed number of non-continuous occurrences of the operating temperature of the second processor being equal to or higher than a first temperature:
halting operation of the second processor,
causing the first processor to perform an information process, and
prohibiting continued operation of the second processor until restart of the information processing apparatus.

12. The information processing apparatus of claim 11, further comprising:
a memory module configured to store a switch flag,
wherein the processor switching control unit further performs, when the operating temperature of the second processor is equal to or higher than the first temperature:
setting the switch flag to a first state when stopping the operation of the second processor and cause the first processor to perform the information process; and
upon a request for performing the information process by the second processor, checking the switch flag to refuse the request when the switch flag is in the first state, thereby prohibiting the operation of the second processor and continuously causing the first processor to perform the information process.

13. The information processing apparatus of claim 11, further comprising:
a throttle control unit communicatively coupled to the throttle number determination unit, the throttle control unit being configured to perform, when the information process is performed by the second processor:
executing the throttling control for the second processor when the operating temperature of the second processor is higher than the first temperature, and
ending the throttling control when the operating temperature of the second processor becomes a second temperature being lower than the first temperature.

14. The information processing apparatus of claim 11,
wherein the first processor is a first graphic controller and the second processor is a second graphic controller, both the first processor and the second processor are configured to perform a display control process.

15. The information processing apparatus of claim 12,
wherein the request for performing the information process by using the second processor is input by the user through an operation input device.

16. The information processing apparatus of claim 12,
wherein, when the switch flag is set to the first state once, the switch flag is cleared only when the system is restarted or shut down.

17. The information processing apparatus of claim 14, further comprising:
a display module configured to display an image based on a video signal that is generated either the first graphic controller or the second graphic controller; and
a notification module configured to cause the first graphic controller and the display module to display a notification image capable of indicating a prohibition of the operation of the second graphic controller in a superimposed manner when the operation of the second graphic controller is prohibited by the processor switching control unit.

18. The information processing apparatus of claim 11,
wherein the processor switching control unit performs, when an alternating current (AC) adaptor is disconnected from the information processing apparatus:
halting the operation of the second processor,
causing the first processor to perform the information process, and
prohibiting the operation of the second processor until restart of the information processing apparatus.

19. An information processing apparatus comprising:
a first processor;
a second processor having greater power consumption than the first processor;
a temperature monitoring unit configured to acquire an operating temperature of the second processor;
a processor switching control unit configured to halt processing by the second processor, when the operating temperature of the second processor is equal to or higher than a first temperature, and select the first processor to handle information processing;
a throttle control unit configured to perform throttling control for the second processor when the operating temperature of the second processor is higher than a second temperature being lower than the first temperature, and ending the throttling control when the operating temperature of the second processor becomes a third temperature being lower than the second temperature; and
a throttle number determination unit to determine whether the throttling control is performed a prescribed number of non-continuous times within a predetermined time interval,
wherein the processor switching control unit configured, when the throttling control is performed the prescribed number of non-continuous times within the predetermined time interval corresponding to a number of non-continuous occurrences that the operating temperature of the second processor exceeds the second temperature, to:
halt operations of the second processor,
cause the first processor to perform the information process, and
prohibit the operation of the second processor until restart of the information processing apparatus.

* * * * *